(12) United States Patent
Sawyer et al.

(10) Patent No.: US 12,294,760 B2
(45) Date of Patent: *May 6, 2025

(54) SYSTEMS AND METHODS FOR DYNAMICALLY ADJUSTING DISPLAY CONTENT AND PARAMETERS ON A DISPLAY DEVICE

(71) Applicant: DK Crown Holdings Inc., Boston, MA (US)

(72) Inventors: Rick Sawyer, Boston, MA (US); Jordan Mendell, Boca Raton, FL (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,806

(22) Filed: Mar. 7, 2023

(65) Prior Publication Data
US 2023/0209127 A1    Jun. 29, 2023

Related U.S. Application Data

(63) Continuation of application No. 16/560,337, filed on Sep. 4, 2019, now Pat. No. 11,606,598.
(Continued)

(51) Int. Cl.
*H04N 21/431* (2011.01)
*G06F 3/14* (2006.01)
(Continued)

(52) U.S. Cl.
CPC ....... *H04N 21/4316* (2013.01); *G06F 3/1446* (2013.01); *H04N 21/4126* (2013.01); *H04N 21/4314* (2013.01); *H04N 21/4532* (2013.01)

(58) Field of Classification Search
CPC .......... H04N 21/4316; H04N 21/4126; H04N 21/4314; H04N 21/4532; H04N 21/41415;
(Continued)

(56) References Cited

U.S. PATENT DOCUMENTS 7,678,487 B2 * 3/2010 Numata .................... F01N 3/05
429/426
8,966,401 B2    2/2015 Kang et al.
(Continued)

OTHER PUBLICATIONS

Communication pursuant to Article 94(3) EPC issued in European Patent Appl. No. 19874849.3 dated Apr. 6, 2023.
(Continued)

*Primary Examiner* — Michael Lee
(74) *Attorney, Agent, or Firm* — Foley & Lardner LLP

(57) ABSTRACT

Systems and methods for dynamically adjusting display content and parameters on a display region are provided. A display manager can control a display environment including a plurality of display regions and can display content items in the display regions. The display manager can identify an event record placed via a client device located in a display zone corresponding to a display region of the display environment. The event record can correspond to an event associated with at least one of the respective content items. The display manager can determine to change a first content item displayed within the display region or a value of a parameter of the display region. The display manager can modify the display region by replacing the first content item with a second content item corresponding to the event associated with the event record or by adjusting the parameter of the display region.

20 Claims, 9 Drawing Sheets

Related U.S. Application Data

(60) Provisional application No. 62/726,711, filed on Sep. 4, 2018.

(51) Int. Cl.
*H04N 21/41* (2011.01)
*H04N 21/45* (2011.01)

(58) Field of Classification Search
CPC . H04N 21/4524; G06F 3/1446; G06F 3/1438; G09G 2354/00; G09G 5/14
See application file for complete search history.

(56) References Cited

U.S. PATENT DOCUMENTS

| | | | |
|---|---|---|---|
| 9,153,101 | B2 | 10/2015 | Cannon et al. |
| 9,609,381 | B2 | 3/2017 | Ahn |
| 9,866,916 | B1 | 1/2018 | Boss et al. |
| 11,606,598 | B2* | 3/2023 | Sawyer ............ H04N 21/4524 |
| 2004/0078817 | A1 | 4/2004 | Horowitz et al. |
| 2008/0007654 | A1 | 1/2008 | Ryu et al. |
| 2008/0295012 | A1 | 11/2008 | Sloo et al. |
| 2009/0063979 | A1 | 3/2009 | Haber et al. |
| 2009/0100466 | A1 | 4/2009 | Migos |
| 2010/0007791 | A1 | 1/2010 | Meister et al. |
| 2010/0292002 | A1* | 11/2010 | Ward ................ G07F 17/3211 463/43 |
| 2010/0318937 | A1 | 12/2010 | Nobe et al. |
| 2011/0093339 | A1 | 4/2011 | Morton |
| 2011/0119132 | A1 | 5/2011 | Morton et al. |
| 2012/0220353 | A1 | 8/2012 | Massing et al. |
| 2012/0271715 | A1 | 10/2012 | Morton et al. |
| 2013/0335637 | A1 | 12/2013 | Kassam et al. |
| 2014/0016035 | A1 | 1/2014 | Brown et al. |
| 2015/0095949 | A1 | 4/2015 | Kim et al. |
| 2016/0063956 | A1 | 3/2016 | Andolina |
| 2016/0134948 | A1 | 5/2016 | Xu et al. |
| 2016/0241905 | A1 | 8/2016 | Gao et al. |
| 2016/0261837 | A1 | 9/2016 | Thompson et al. |
| 2016/0345044 | A1 | 11/2016 | Klappert et al. |
| 2018/0012567 | A1 | 1/2018 | Underkoffler |
| 2018/0046423 | A1 | 2/2018 | Abraham et al. |
| 2018/0052582 | A1 | 2/2018 | Hilbert et al. |
| 2018/0192135 | A1 | 7/2018 | Sirpal et al. |
| 2018/0192144 | A1 | 7/2018 | Mcelroy |
| 2018/0293959 | A1 | 10/2018 | Monga |
| 2018/0343500 | A1 | 11/2018 | Perinchery et al. |
| 2019/0054377 | A1* | 2/2019 | Nelson ................ G07F 17/3246 |
| 2020/0051397 | A1* | 2/2020 | Jones ................ G07F 17/3244 |
| 2020/0068245 | A1 | 2/2020 | Sinnott et al. |
| 2020/0357246 | A1 | 11/2020 | Nelson et al. |
| 2021/0110632 | A1 | 4/2021 | Nelson et al. |
| 2021/0217126 | A1* | 7/2021 | Hayon ................ G07F 17/3269 |

OTHER PUBLICATIONS

Examiner's Report on AU Appl. No. 2021204766 dated Jul. 18, 2023.
Examination Report on AU Appl. No. dated Sep. 7, 2022.
Examiner's Report on CA Appl. No. 3111635 dated Apr. 29, 2022.
Extended EP Search Report on EP Appl. No. 19874849.3 dated Apr. 25, 2022.
Final Office Action on U.S. Appl. No. 16/560,337 dated Jul. 18, 2022.
International Preliminary Report on Patentability n PCT Appl. No. PCT/US2019/049499 mailed Mar. 18, 2021.
International Search Report and Written Opinion for International Appl. No. PCT/US2019/049499 mailed on Mar. 4, 2020.
Non-Final Office Action on U.S. Appl. No. 16/560,337 dated Mar. 8, 2022.
Notice of Allowance on U.S. Appl. No. 16/560,337 dated Apr. 1, 2020.
Notice of Allowance on U.S. Appl. No. 16/560,337 dated Feb. 25, 2020.
Notice of Allowance on U.S. Appl. No. 16/560,337 dated Nov. 9, 2022.
Examiner's Report on CA Appl. No. 3,176,689 dated Mar. 1, 2024.

* cited by examiner

SYSTEMS AND METHODS FOR DYNAMICALLY ADJUSTING DISPLAY CONTENT AND PARAMETERS ON A DISPLAY DEVICE

CROSS-REFERENCE TO RELATED APPLICATIONS

The present application is a continuation of and claims priority to U.S. patent application Ser. No. 16/560,337, filed Sep. 4, 2019, and titled "SYSTEMS AND METHODS FOR DYNAMICALLY ADJUSTING DISPLAY CONTENT AND PARAMETERS ON A DISPLAY DEVICE," which claims the benefit of and priority to U.S. Provisional Application 62/726,711, filed on Sep. 4, 2018. The entire disclosure of each of which are incorporated herein by reference in their entirety.

BACKGROUND OF THE DISCLOSURE

Social establishments can include multiple televisions to display content for visitors within the respective social establishment. Typically the content displayed is controlled based on a current television schedule or the content is randomly selected. Further, the content is not controlled or managed by a centralized system. Thus, the content displayed is not personalized or selected for a particular user. For example, visitors to the social establishment may have no interest in what is being displayed. As such, social establishments should utilize appropriate resource management system to provide relevant content to visitors of their respective establishment.

BRIEF SUMMARY OF THE DISCLOSURE

The present disclosure relates to one or more systems and methods for dynamically adjusting display content and parameters on one or more display regions on a large screen display device or one or more individual display devices. A content management system can control content displayed on the display regions based in part on data received from one or more client devices. For example, the content management system can generate or tailor content on one or more display regions closest to (e.g., within a predetermined distance from) a particular user of a client device based in part on the user's interactions at the client device or an event record via the client device. The content management system can generate and control the one or more display regions to display content (e.g., content items) more prominently that the user is more likely to be interested in or more likely to interact with. For example, the content management system can dynamically change the display size, display location or otherwise enhance the display of the content generated for the user on the display device closest to (e.g., within a predetermined distance from) a particular user. In some embodiments, the content management system can determine a layout that includes prominently displaying certain content determined to be more relevant to the user by, for example, allocating more pixels of a display to the certain content, while allocating fewer pixels to other content determined to be less likely to the one or more users within a predetermined proximity from the display.

The content management system can execute within a display environment (e.g., contest viewing environment) and can control and manage the content displayed on one or more display regions within the display environment. For example, the display environment can include a single or multiple large screen display devices (e.g., wrap around screens, projection screens) that are made up or can be made up different display regions to display content. For example, the large screen display device can display a single sports contest or multiple sports contests by allocating a number of pixels to the particular sports contest. The large screen display device can include a total number of pixels and the content management system can control allocation of these pixels to determine how many different pieces of content are displayed, the size of each piece of content and/or the location of each piece of content within the large screen display device. For example, the content management system can generate display regions within the large screen display device. Each display region can correspond to a group of pixels of the total number of pixels of the large screen display device. The content management system can dynamically modify (e.g., increase, decrease) the number of pixels of each display region to adjust the size of content being displayed and/or change content being displayed. The content management system can dynamically modify the particular pixels allocated to each display region or to different content to move content from one location on the large screen display device to a different location on the large screen display device. Thus, the content management system can adjust the size or location of each piece of content within the large screen display device through control, allocation and management of the pixels of the large screen display device.

The display environment can include multiple display regions. Each of the display regions can be separate and unique from each other and correspond to unique display devices (e.g., individual televisions). The individual display regions can be individually controlled by a display manager of the content management system. For example, each of the display regions can display different content (e.g., different sports contests) or they can display the same content. The display manager of the content management system can control the allocation of pixels on each of the individual display regions to control the content being displayed and/or the size of the content being displayed. For example, the display manager can assign one or more display regions to a particular user or group of users such that those display regions display content that the particular user or group of users is more likely to be interested in and interact with.

In at least one aspect, a method is provided. The method can include controlling, by a display manager including one or more processors, a display environment including a plurality of display regions. Each display region can correspond to a respective display zone within a physical environment. The display manager can be configured to display respective content items in the respective display regions of the plurality of display regions and configured to set one or more values corresponding to one or more parameters of the plurality of display regions for displaying respective content items in the plurality of display regions. The method can include identifying, by the display manager, a first event record placed via a client device located in a first display zone corresponding to a first display region of the display environment. The first event record can correspond to an event associated with at least one of the respective content items. The method can include determining, by the one or more processors, based on the first event record satisfying a display region modification condition, to change a first content item displayed within the first display region or a value of a parameter of the first display region. The method can include modifying, by the one or more processors, responsive to determining to change the first content item or the value of the parameter, the first display region by replacing the first content item with a second content item corresponding to the event associated with the first event record or by adjusting the parameter of the first display region.

In some embodiments, the one or more parameters of the plurality of display regions include at least one of: a number of pixels or a location value. The method can include identifying, by the one or more processors, at least one display region within the display environment within a predetermined distance from the client device. The method can include dynamically changing, by the one or more processors, a first number of pixels allocated to the first content item on the first display region and a second number of pixels allocated to the second content item on the first display region, the second number of pixels different from the first number of pixels. In embodiments, the first event record can include at least one of: a log-in event, a received commitment, updating a fantasy line-up, or modifying a user profile.

In some embodiments, the method can include dynamically increasing, by the one or more processors, the second number of pixels allocated to the second content item responsive to a second event record at the client device within the display zone of the client device. The method can include dynamically decreasing, by the one or more processors, the first number of pixels allocated to the first content item. The method can include dynamically increasing, by the one or more processors, the second number of pixels allocated to the second content item responsive to a plurality of event records received via a plurality of client devices within display zones of the plurality of client devices. The method can include dynamically decreasing, by the one or more processors, the first number of pixels allocated to the first content item.

In embodiments, the method can include determining, by the one or more processors, properties of the first content item currently displayed on the display device. The method can include comparing, by the one or more processors, the properties of the first content item to a user profile associated with the user of the client device. The method can include assigning, by the one or more processors, responsive to the first event record, one or more display regions of the plurality of display regions to the display zone of the client device. The method can include switching, by the one or more processors, the first content item on the first display region to the second content item on the first display region responsive to the first event record.

In some embodiments, the method can include determining, by the one or more processors, a location of the user of the client device responsive to the first event record. The method can include identifying, by the one or more processors, one or more display regions of the plurality of display regions within the display zone of client device based on the location of the user. The method can include generating, by the one or more processors, third content item for the first display region based on a plurality of users within the predetermined distance from the first display region. The method can include dynamically changing, by the one or more processors, the second number of pixels allocated to the second content item on the first display region and a third number of pixels allocated to the third content item on the first display region, the third number of pixels different from the second number of pixels.

In embodiments, the method can include dynamically changing, by the one or more processors, a first number of pixels allocated to the first content item on the first display region and a second number of pixels allocated to the second content item on the first display region. The second number of pixels can be different from the first number of pixels responsive to a score change in the first contest or the second contest. The method can include dynamically changing, by the one or more processors, a first number of pixels allocated to the first content item on the first display region and a second number of pixels allocated to the second content item on the first display region. The second number of pixels can be different from the first number of pixels responsive to a change in betting activity corresponding to the first contest item or the second contest item.

In at least one aspect, a system is provided. The system can include a display manager having one or more processors and memory storing machine-readable instructions. The instructions when read by the one or more processors, cause the one or more processors of the display manager to control a display environment including a plurality of display regions. Each display region can correspond to a respective display zone within a physical environment. The display manager can be configured to display respective content items in the respective display regions of the plurality of display regions and configured to set one or more values corresponding to one or more parameters of the plurality of display regions for displaying respective content items in the plurality of display regions. The instructions can cause the one or more processors to identify a first event record placed via a client device located in a first display zone corresponding to a first display region of the display environment. The first event record can correspond to an event associated with at least one of the respective content items. The instructions can cause the one or more processors to determine, based on the first event record satisfying a display region modification condition, to change a first content item displayed within the first display region or a value of a parameter of the first display region. The instructions can cause the one or more processors to modify, responsive to determining to change the first content item or the value of the parameter, the first display region by replacing the first content item with a second content item corresponding to the event associated with the first event record or by adjusting the parameter of the first display region.

In some embodiments, the one or more parameters of the plurality of display regions include at least one of: a number of pixels or a location value. The instructions can cause the one or more processors to identify at least one display region within the display environment within a predetermined distance from the client device. The instructions can cause the one or more processors to dynamically change a first number of pixels allocated to the first content item on the first display region and a second number of pixels allocated to the second content item on the first display region, the second number of pixels different from the first number of pixels. The instructions can cause the one or more processors to dynamically increase the second number of pixels allocated to the second content item responsive to a second event record at the client device within the display zone of the client device. The instructions can cause the one or more processors to dynamically decrease the first number of pixels allocated to the first content item. The instructions can cause the one or more processors to dynamically increase the second number of pixels allocated to the second content item responsive to a plurality of event records received via a plurality of client devices within display zones of the plurality of client devices. The instructions can cause the one or more processors to dynamically decrease the first number of pixels allocated to the first content item.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for dynamically adjusting display content and parameters on a display region.

A. Computing and Network Environment

Figure 1A:
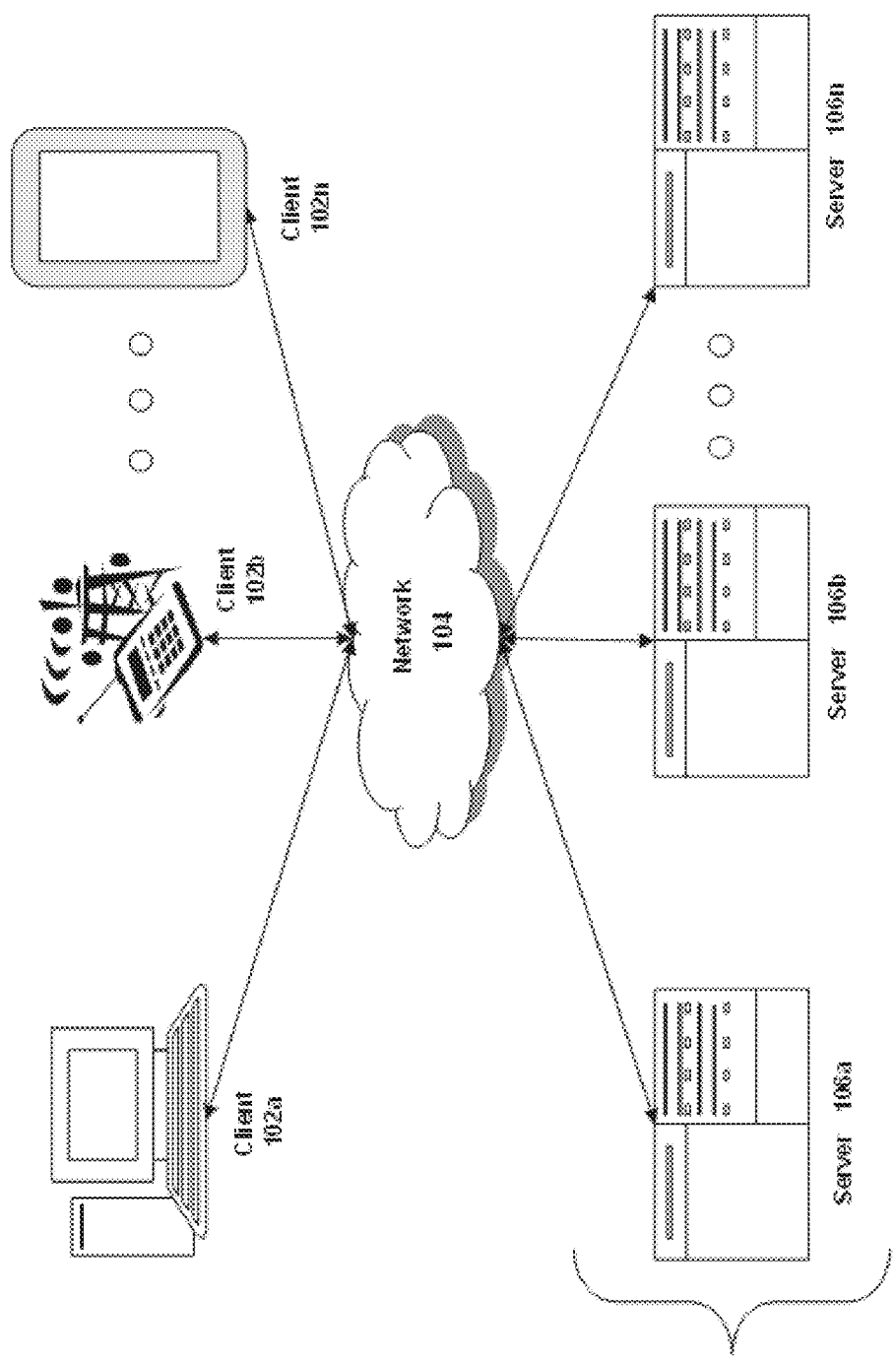
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
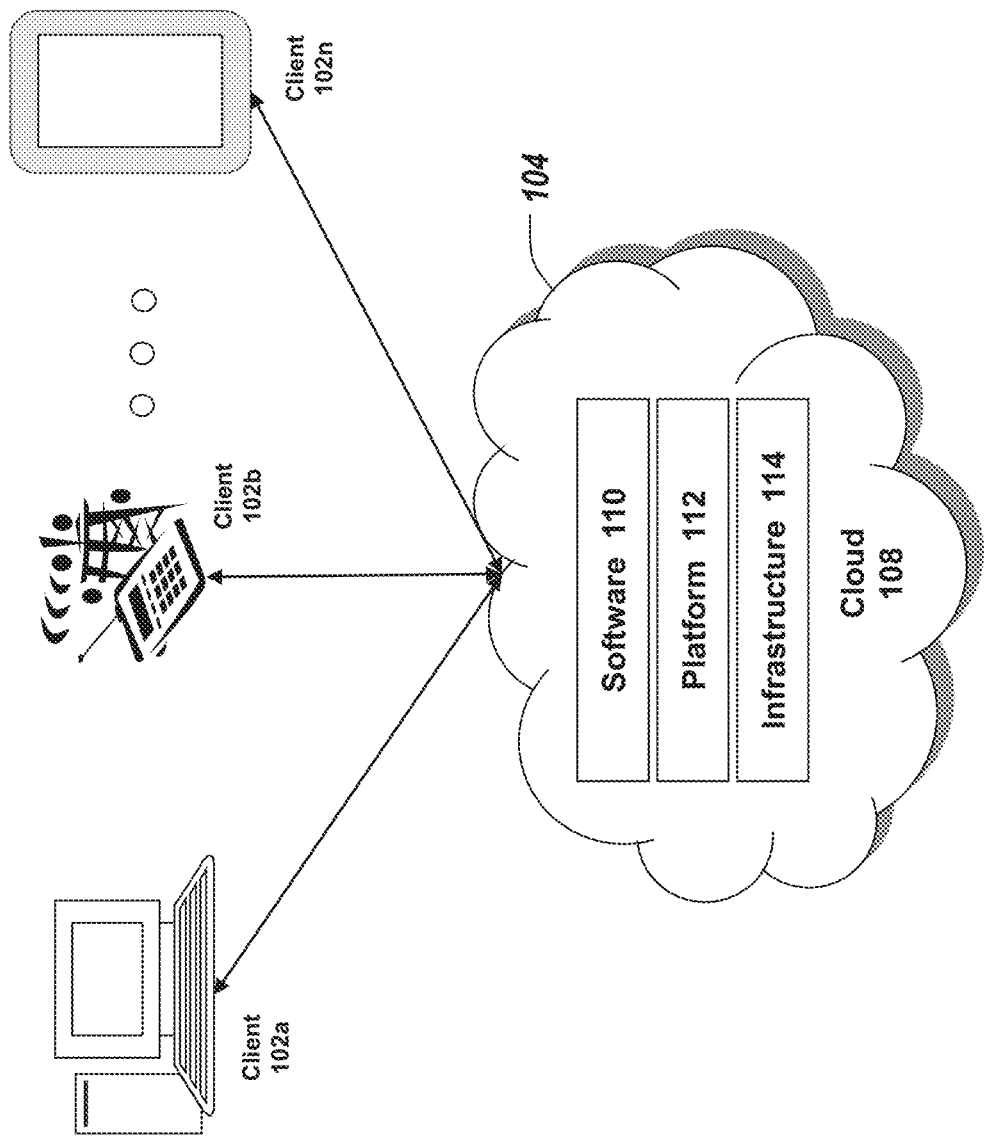
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
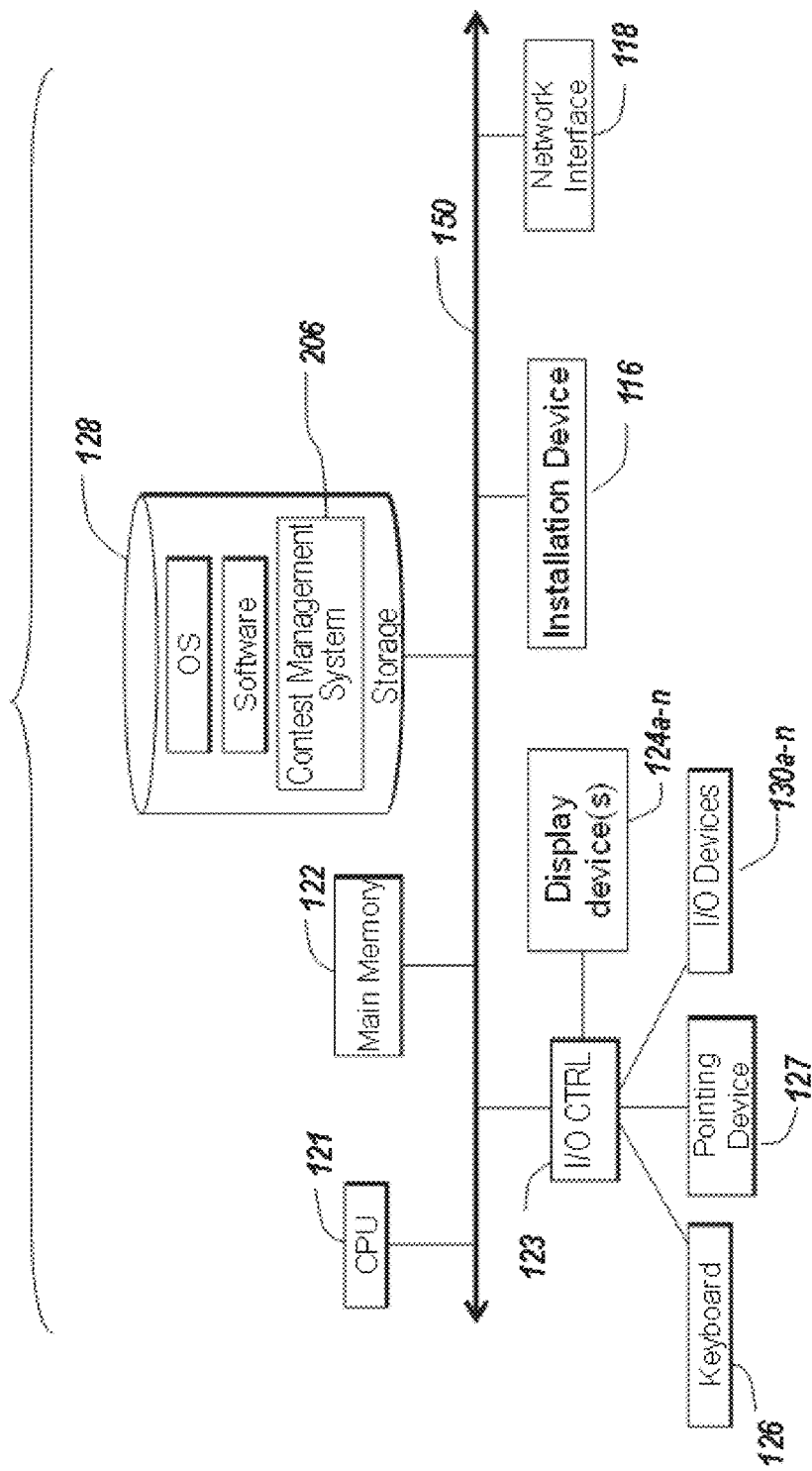
FIGS. 1C and 1D are block diagrams depicting embodiments of computing devices useful in connection with the methods and systems described herein.
Figure 1D:
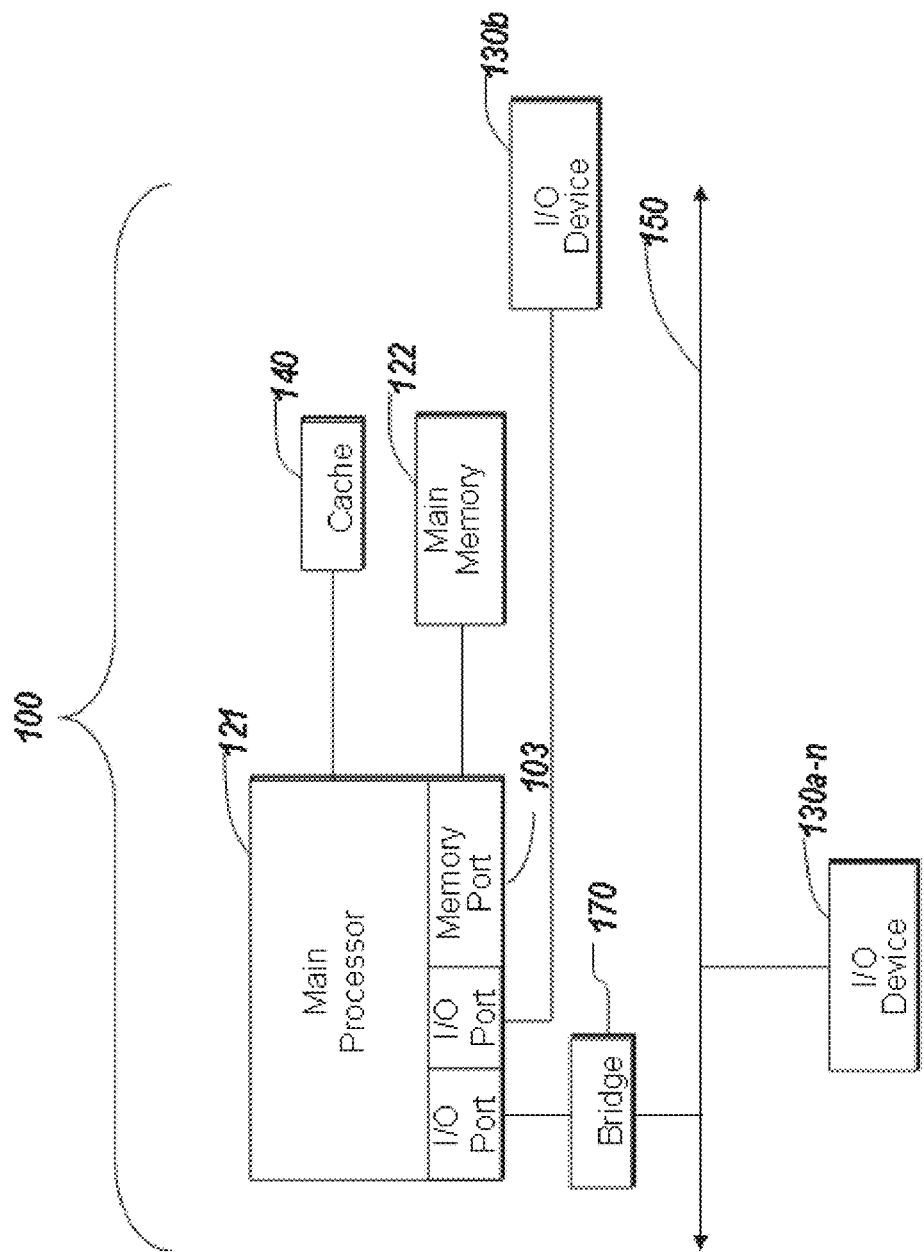

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display regions 124a-124n, a keyboard 126 and a pointing device 127, e.g. a mouse. The storage device 128 may include, without limitation, an operating system, software, and a software of a content management system 206. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display regions 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display regions 124a-124n may be connected to I/O controller 123. Display regions may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display regions 124a-124n may also be a head-mounted display (HMD). In some embodiments, display regions 124a-124n or the corresponding I/O controllers 123 may be controlled through or have hardware support for OPENGL or DIRECTX API or other graphics libraries.

In some embodiments, the computing device 100 may include or connect to multiple display regions 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display regions 124a-124n by the computing device 100. For example, the computing device 100 may include any type and/or form of video adapter, video card, driver, and/or library to interface, communicate, connect or otherwise use the display regions 124a-124n. In one embodiment, a video adapter may include multiple connectors to interface to multiple display regions 124a-124n. In other embodiments, the computing device 100 may include multiple video adapters, with each video adapter connected to one or more of the display regions 124a-124n. In some embodiments, any portion of the operating system of the computing device 100 may be configured for using multiple displays 124a-124n. In other embodiments, one or more of the display regions 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display regions 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the content management system 206. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2050, WINDOWS Server 2022, WINDOWS CE, WINDOWS Phone, WINDOWS XP, WINDOWS VISTA, and WINDOWS 7, WINDOWS RT, WINDOWS 8, and WINDOWS 10, all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Dynamically Adjusting Display Content and Parameters on a Display Device The following description relates to one or more systems and methods for dynamically adjusting display content and parameters on a display device. A content management system can receive an event record 211 and dynamically change or modify content displayed on one or more display regions within a display zone of a client device the event record 211 was generated at, recorded at or received at. The content management system can control content displayed on the display regions based in part on data received from the client devices. For example, the content management system can select or tailor content on display regions closest to (e.g., within a display zone of one or more display regions, within a predetermined distance from the client device) a particular user of a client device based in part on the user's interactions at the client device. The content management system can select and control the display regions to display content more prominently that the user is more likely to be interested in or more likely to interact with (e.g., place wagers on). The content management system can dynamically change or modify the display size, display location or otherwise enhance the display of the content generated for the user on the display device closest to (e.g., within a display zone, within a predetermined distance from) a particular user. For example, the content management system can dynamically change or modify the properties of content on one or more display regions responsive to score changes, changes in betting activity, or user profile attributes of one or more users based in part on a display zone of one or more client devices.

The display environment can include a gaming or sports environment having a plurality of display regions for displaying and showing a variety of different sporting events (e.g., football games, basketball games, boxing matches). The display environment can include a place where users can place a wager on various sports competitions. For example, the display environment may include a casino of a sports book. Thus, the content management system can dynamically control the content displayed on display regions within the display environment to modify content based on current games, changes in betting activity, or interests of one or more users within the display environment. For example, the content management system can dynamically modify content responsive a score change in a sports contest, such as but not limited to, a football game having a tie score in the fourth quarter. The content management system can dynamically modify content responsive to receiving an increase in betting activity on a particular sports competition, thus indicating an increased interest in the particular sports competition.

Figure 2:
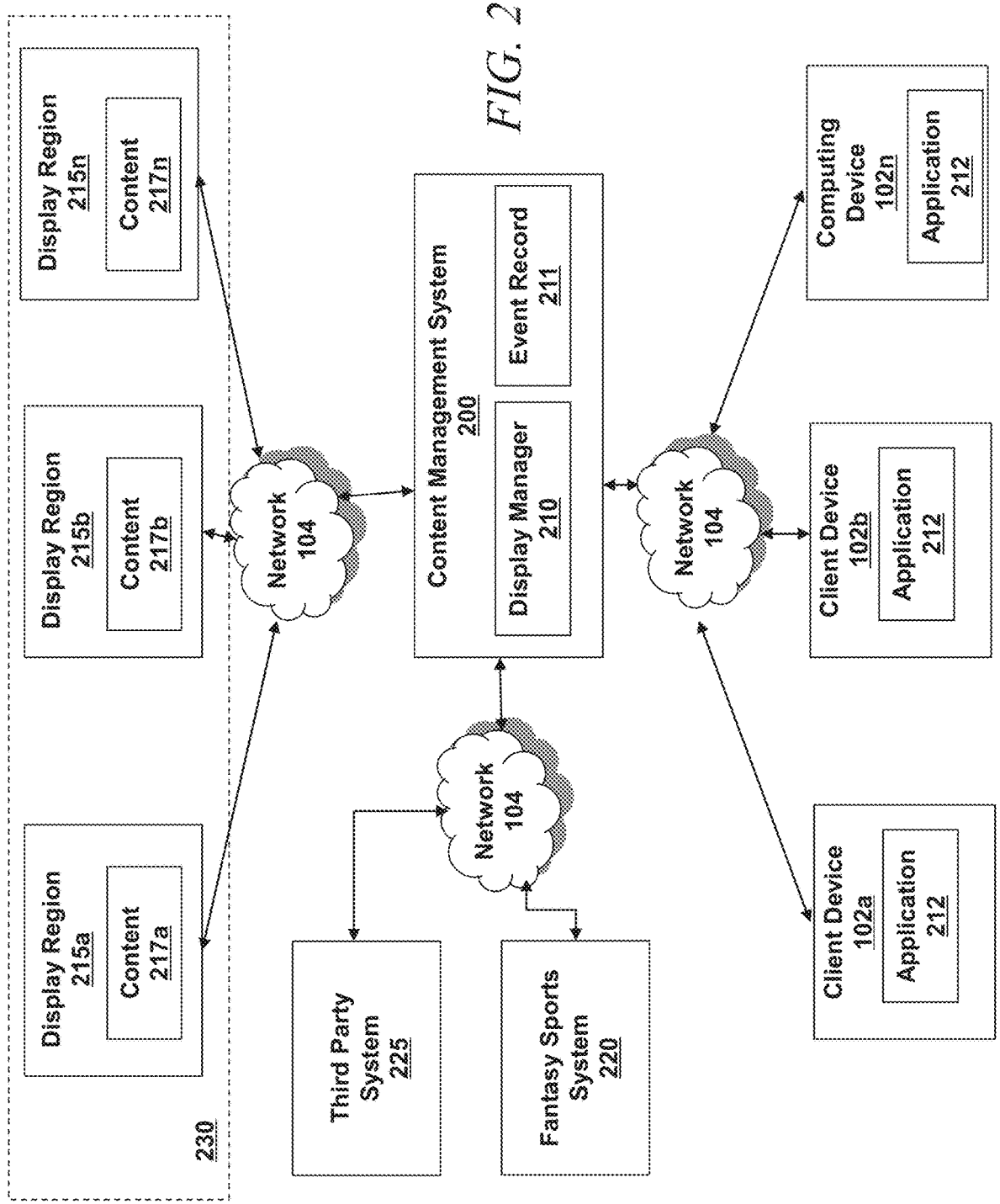
FIG. 2 depicts one or more embodiments of a content management system for dynamically adjusting display content and parameters on a display region.

Now referring to FIG. 2, a content management system 200 is communicatively coupled to a plurality of client devices 102a-102n and a plurality of display regions 215a-215n through one or more networks 104. The content management system 200 can include or be coupled with a fantasy sports system 220 and a third party system 225. The content management system 200 can be the same as or substantially similar to the content management system 206 of FIG. 1C. The content management system 200 can identify or select content from a plurality of available content items 217a-217n to display on one or more of the display regions 215a-215n for users of the client devices 102a-102n.

The content management system 200 can include a display manager 210. The display manager 210 can be implemented using hardware or a combination of software and hardware. For example, each component of the display manager 210 can include logical circuitry (e.g., a central processing unit or CPU) that responses to and processes instructions fetched from a memory unit. Each component of the display manager 210 can include or use a microprocessor or a multi-core processor. A multi-core processor can include two or more processing units on a single computing component. Each component of the display manager 210 can be based on any of these processors, or any other processor capable of operating as described herein. The display manager 210 can include one or more processors. The one or more processors can be connected to or coupled with a memory or storage device of the display manager 210. The display manager 210 and/or one or more processors of the display manager 210 can be configured to execute or perform the functionalities of the method 300. In embodiments, the one or more processors can include non-volatile memory that stores computer instructions and an operating system. For example, the computer instructions can be executed by the one or more processors out of volatile memory to perform all or part of the method 300.

Client devices 102a-102n can be the same as or substantially similar to client devices 102a-102n described above with respect to FIGS. 1A-1B. The client devices 102a-102n can include, but not limited to, a computing device, handheld device, mobile device, a terminal (e.g., betting terminal), television or any form of a graphical user interface in which a user can enter information at a display environment 230. The client devices 102a-102n can include an application 212 for a user of a client device 102 to interact with or generate an event record 211 via the application 212. The application 212 may include, but not limited to, a fantasy sports application, a casino website, a sports book website, a user profile (e.g., a user profile for a fantasy sports application, a casino website, a sports book website), or a content application. An interaction may include, but not limited to a log-in event, receiving a wager, requesting betting lines, updating a fantasy sports line-up, or modifying a user profile.

Fantasy sports system 220 can include or store a plurality of user profiles for users of the client devices 102a-102n. The user profiles can be associated with one or more users of contests generated and executed by the content management system 200.

The display regions 215a-215n can be included within a display environment 230. The display environment 230 can include or be referred to as a contest viewing environment. The display environment 230 may include a variety of different environments for displaying sporting events, political events, gaming events, card events, or any events of interest to a particular group of users. For example, the display environment 230 may include, but not limited to, a casino, a sports book, a restaurant, a bar, or a sporting event. The display regions 215a-215n can be the same as or substantially similar to display devices 124a-124n described above with respect to FIG. 1C. The display regions 215a-215n can include or correspond to different display regions, such as but not limited to, for televisions, computing devices, or a variety of other display devices. For example, the display environment 230 can include a single or multiple large screen display devices (e.g., wrap around screens, projection screens) that are made up or can be made up different display regions 215 to display content item 217. The large screen display device can include a total number of pixels and the content management system 200 can control allocation of these pixels to determine how many different pieces of content are displayed, the size of each piece of content or content item 217 and/or the location of each piece of content or content item 217 within the large screen display device. For example, the content management system 200 and/or display manager 210 can generate display regions 215 within the large screen display device. Each display region 215 can correspond to a group of pixels of the total number of pixels of the large screen display device. The content management system 200 and/or display manger 210 can dynamically modify (e.g., increase, decrease) the number of pixels of each display region 215 to adjust the size of one or more content items 217 being displayed and/or change one or more content items 217 being displayed. The content management system 200 and/or display manager 210 can dynamically modify the particular pixels allocated to each display region 215 or to different content to move a content item 217 from one location on the large screen display device to a different location on the large screen display device. Thus, the content management system 200 and/or display manager 210 can adjust the size or location of each content item 217 within the large screen display device through control, allocation and management of the pixels of the large screen display device.

The display regions 215a-215n can correspond to multiple display devices. Each of the display devices can be separate and unique from each other. The individual display devices can be individually controlled by the content management system 200. For example, each of the display regions 215a-215n forming the different display devices can display different content (e.g., different sports contests) or they can display the same content item 217. The content management system 200 and/or display manager 210 can control the allocation of pixels on each of the individual display regions 215a-215n to control the content being displayed and/or the size of the content being displayed. For example, the content management system 200 and/or display manager 210 can assign one or more display regions 215a-215n to a particular user or group of users such that those display regions 215a-215n display content that the particular user or group of users is more likely to be interested in and interact with.

The display regions 215a-215n include a screen (e.g., viewing page, display screen, display portion) to display one or more pieces of content item 217. The content items 217 can include, but not limited to, a variety of different sporting contests, political events, gaming events or card events. For example, the content items 217 can include, but not limited to a basketball game, a football game, a baseball game, or a boxing match.

Each of the content item 217a-217n can include content attributes. The content attributes can include, but not limited to, a sport category, a contest name, a total value of wagers placed on a contest, a total number of wagers placed on a contest, players involved in a contest (e.g., players participating in the contest), fantasy line-ups. The content item 217a-217n may include a score banner (e.g., score bar, score bug, score ticker, or a score headline) to show scores on one or more of the display regions 215a-215n. The score banner can be used by the content management system 200 to alert users of the client devices 102a-102n of events, such as sports games or matches, that are underway, close events or to highlight important events during a particular contests (e.g., tied contest, two-minute warning of a football game, overtime match, etc.). For example, the content item 217a-217n can include a digital on-screen graphic which is displayed at a predetermined region (for instance, either the top or bottom) of a display region 215a-215n during a broadcast of a sporting event in order to display a current score and other statistics of the current contest or other contests not currently being displayed.

The content management system 200 can identify one or more content items 217a-217n based in part on client data received from at least one of the client devices 102a-102n. For example, a user of a client device 102 can provide an event record 211 (e.g., wager, bet, user profile data, password, credentials) correspond to an upcoming contest corresponding to at least one of the content item 217. An event record 211 can include, but not limited to, a login event to a fantasy sports system, a login event to a user profile, a bet, a wager, and/or a request for content item 217. In embodiments, the event record 211 can include a data structure, data packet or form of data transmission correspond to at least one user and at least one content item 217. In some embodiments, a user of a client device 102 can place a wager (e.g., event record 211) on an upcoming contest corresponding to at least one of the content item 217. The user of the client device 102 can be a person or system interacting with the particular client device 102, a person within a display zone 240 (e.g., viewing zone) of the particular client device 102, and/or multiple people within the display zone 240 of the particular client device 102. The display manager 210 of the content management system 200 can identify the content item 217 corresponding to the bet (e.g., event record 211) to display to the user of the client device 102 at a display device 215 that is nearest to the respective client device 102.

The display manager 210 of the content management system 200 can display multiple content items 217a-217n on a single display region 215. The display manager 210 of the content management system 200 can algorithmically arrange the plurality of content items 217a-217n in a screen of the display device based in part on a weight value assigned to each of the content items 217a-217n. The weight values can be assigned based in part on contest attributes of the content items 217a-217n and/or event records 211 (e.g., client data) received from the client devices 102a-102n.

The display manager 210 of the content management system 200 can include or execute a ranking algorithm, to filter, rank, and organize the content items 217a-217n for display on one or more of display regions 215a-215n for presentation to a user tor group of users within a display zone 240 of at least one of client devices 102a-102n. The display manager 210 of the content management system 200, using a ranking algorithm, can be configured to assign frequency values, importance values, rank values, and/or weight values to the content items 217a-217n based in part on similarities between contest attributes of the content items 217a-217n and client data received from client devices 102a-102n. The display manager 210 of the content management system 200 can use the ranking algorithm to determine what content items 217a-217n should be displayed on display regions 215a-215n based in part on a user of a client device 102 nearest to the respective display region 215.

Each of the above-mentioned elements or entities is implemented in hardware, or a combination of hardware and software, in one or more embodiments. Each component of the content management system 200 and display manager 210 may be implemented using hardware or a combination of hardware or software detailed in connection with FIG. 2 and FIGS. 4A-5. For instance, each of these elements or entities can include any application, program, library, script, task, service, process or any type and form of executable instructions executing on hardware of the content management system 200 and/or display manager 210. The hardware includes circuitry such as one or more processors in one or more embodiments. In some embodiments, the components of the content management system 200 and/or display manager 210 may be implemented or include a non-transitory computer-readable medium that includes instructions that, when executed by a processor of the content management system 200 and/or display manager 210 cause the processor to execute or perform the functionalities of the method 300.

Figure 3:
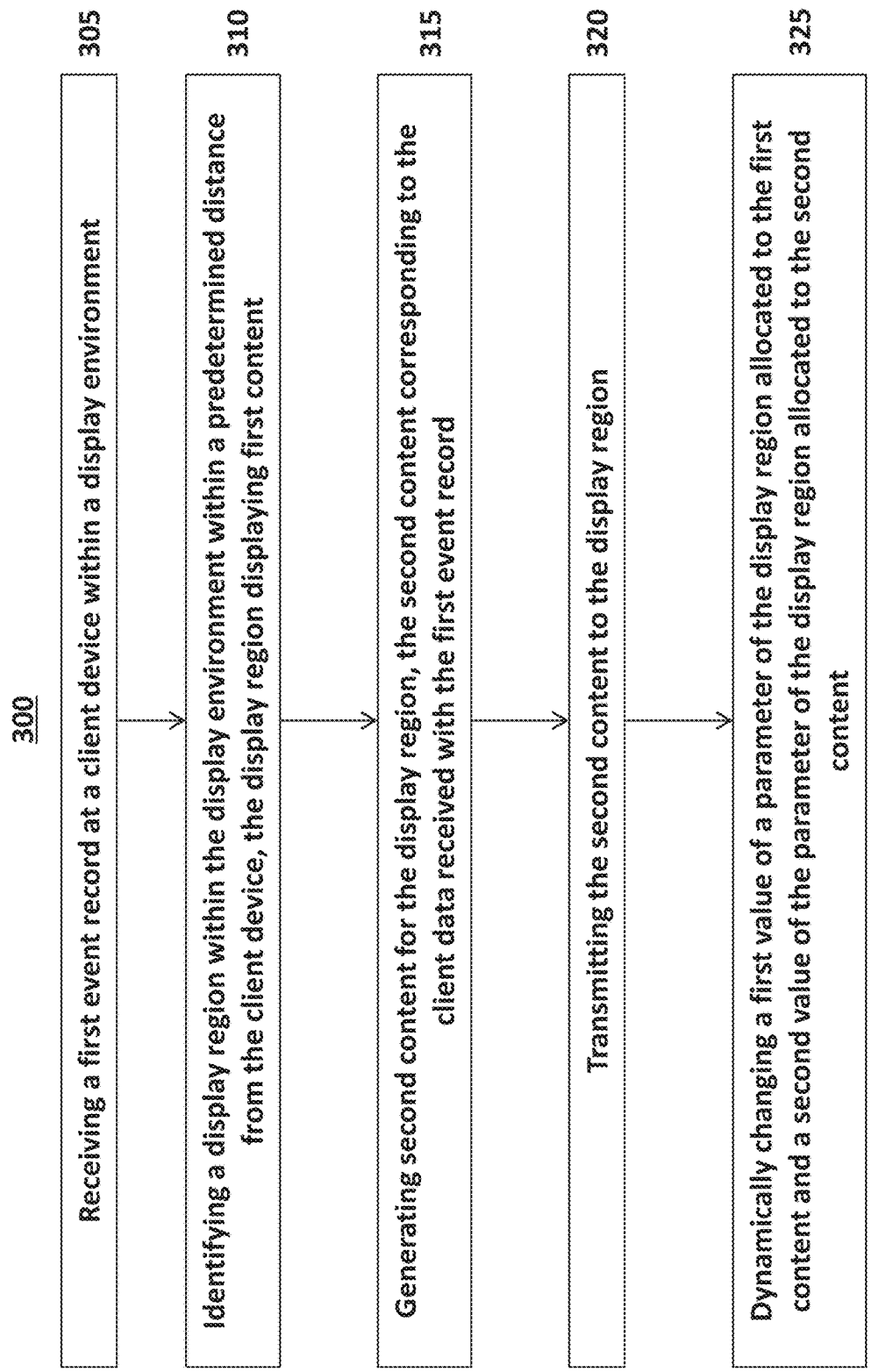
FIG. 3 shows a flow diagram of a method for dynamically adjusting display content and parameters on a display region.

Now referring to FIG. 3, a method 300 for dynamically adjusting display content and parameters on a display region 215 is provided. The display manager 210 and/or content management system 200 can perform or execute the functionalities of the method 300. Method 300 begins at block 305 by receiving a first event record 211 (e.g., user interaction) at a client device 102 within a display environment 230. The first event record 211 can include client data. The first event record 211 can be received by a display manager 210 of the content management system 200 having one or more processors executing thereon.

The display manager 210 can include one or more processors and control a display environment 230 including a plurality of display regions 215. Each display region 215 can correspond to a respective display zone 240 within a physical environment. In some embodiments, multiple display regions 215 can be in or part of the same display zone 240. The display manager 210 can be configured to display respective content items 217 in the respective display regions 215 of the plurality of display regions 215. The display manager 210 can be configured to set one or more values corresponding to one or more parameters of the plurality of display regions 215 for displaying respective content items 217 in the plurality of display regions 215. For example, the content management system 200 can be coupled with one or more client devices 102 and one or more display regions 215 or a large screen display device. Each display region 215 can correspond to a group of pixels within the large screen display device. In some embodiments, the display regions 215 can correspond to individual display devices, such as but not limited to, individual televisions. The content management system 200 can be disposed within a network 104 between the client devices 102 and the display regions 215. The display manager 210 of the content management system 200 can control content item 217 displayed on the display regions 215 based in part on data received from the client devices 102. For example, the display manager 210 can generate or tailor content item 217 on display regions 215 closest to (e.g., within a display zone of, within a predetermined distance from) a particular user of a client device 102 based in part on event records 211 received via the client device 102 and/or user's interactions at the client device 102. The display manager 210 can generate and control the display regions 215 to display content item 217 more prominently that the user is more likely to be interested in or more likely to interact with (e.g., place wagers on). For example, the display manager 210 can dynamically change the display size, display location or otherwise enhance the display of the content item 217 generated for the user on the display device closest to (e.g., within a predetermined distance from) a particular user. In some embodiments, the display manager 210 can determine a layout that includes prominently displaying (e.g. allocating more pixels) to content item 217 generated for the user.

The display environment 230 can include a gaming or sports environment having a plurality of display regions 215 for displaying and showing a variety of different sporting events (e.g., football games, basketball games, boxing matches), political events, gaming events, card events, or any events of interest to a particular user or group of users. The display environment 230 can include a place where users can place a wager on various sports competitions. For example, the display environment 230 may include, but not limited to, a casino of a sports book.

The display manager 210 can identify a first event record 211 placed via a client device 102 located in a first display zone 240 corresponding to a first display region 215 of the display environment 230. The first event record 211 can correspond to an event associated with at least one of the respective content items 217. In embodiments, a user can initiate or generate an event record 211 by interacting at one or more systems at, within or coupled with (e.g., communicatively coupled) the display environment 230. Systems may include a computing device, mobile device, a terminal (e.g., betting terminal), television, application 212 or any form of a graphical user interface in which a user can enter information at the respective display environment 230. An event record 211 can include, but not limited to, a user interaction (or more simply an interaction), a log-in event, receiving a wager, requesting betting lines, updating a fantasy sports line-up, or modifying a user profile. For example, a user can log-in to a terminal (e.g., client device 102) at the display environment 230 and generate an event record 211. Responsive to the log-in event, the event record 211 can be received at a content management system 200 by the display manager 210 that is coupled with the terminal and one or more display regions 215 at the display environment 230. The event record 211 can include and/or provide client data to the content management system 200. The client data can include a variety of different information on the user of the client device 102 and/or the client device 102. For example, the client data can include a user profile corresponding to the user of the client device 102, user history of contests the user has participated in previously, wager information for current or previous wagers, and/or fantasy line-ups associated with the user. The client data may include a location of the client device 102, a location of the display environment 230, time of day, date, and/or one or more display regions 215 linked with or within a display zone 240 of the respective client device 102.

In some embodiments, the display manager 210 can generate a user profile of the user of the client device 102 using the client data. For example, if the user of the client device 102 does not have a user profile with the content management system 200, the display manager 210 can generate a new user profile for the user and store data corresponding to the event records 211 at the display environment 230.

The display manager 210 can retrieve contest data for the day and/or time that the event record 211 is generated or occurs. For example, the display manager 210 can retrieve a sports listing or listing of all games or sporting matches currently occurring or scheduled in to occur in the future (e.g., later that day). The display manager 210 can identify contests that may be underway or scheduled to start that the user may be interested in based in part on the client data received. In some embodiments, the display manager 210 can identify contests including one or more players from a fantasy line-up associated with the user or based on wagers made by the user.

At block 310, method 300 includes identifying a display region 215 within the display environment 230 within a display zone 240 of the client device 102. A display zone 240 may be referred to as a viewing zone or viewing area in which the client device 102 or a user of the client device 102 can see a display region 215 and/or a display environment 230. The display region 215 can be displaying first content item 217 (e.g., first contest). The display manager 210 can determine a location of the user at or within the display environment 230. The location of the user can be determined based in part on which client device 102 the user interacts with and/or the location of the client device 102. The display manager 210 may identify a display region 215 within the display environment 230 that is within a predetermined distance from the client device 102.

The display manager 210 can include and execute location algorithms to determine the location of the client device 102, such as but not limited to, a mobile device the user is using to place wagers at the display environment 230. For example, the display manager 210 can include a tracking module configured to execute a global positioning system (GPS) triangulation algorithm, cell tower triangulation algorithm, and/or Wi-Fi positioning algorithm. The GPS triangulation algorithm can include a GPS receiver on the content management system 200 identifying a distance from its location to one or more satellites and a distance from the client device 102 to the one or more satellites. The display manager 210 can determine a three-dimensional position including a latitude value, longitude value, and an altitude value. The cell tower triangulation algorithm can include the content management system 200 identifying a distance from its location to one or more satellites and picking up a cell phone signal from the client device 102 to the one or more satellites to determine the location of the client device 102. The Wi-Fi positioning algorithm can include the display manager 210 identifying a distance from its location to one or more satellites and identifying a Wi-Fi connection from the client device 102 to the one or more satellites to determine the location of the client device 102. In some embodiments, the display manager 210 can couple with the client device 102 to access location tracking systems or global positioning systems (GPS) on the client device 102 to determine the location. For example, the display manager 210 can retrieve location tracking data from a client device 102 to determine the location of the client device 102.

The display manager 210 can determine one or more display regions 215 within a display zone 240 of the client device 102 using the location data of the client device 102. For example, the display manager 210 can determine a display region 215 (or display device) that is the closest to the client device 102 and visible to a user at the client device 102. A display zone 240 (e.g., viewing zone) can include a range at which the display region 215 is visible and/or audible to a user of the client device 102. The display zone 240 can vary based in part on a layout of a display environment 230 and/or the number of display regions 215 at the display environment 230. The display zone 240 for a display region 215 can correspond to a screen size of a display device, properties of the display device (e.g., HDTV, plasma TV), a horizontal view, vertical view, and/or a diagonal view of the display device. For a display environment 230 having multiple display regions, the content management system 200 can identify a subset (e.g., three display regions) of display regions 215 closest the client device 102.

The display manager 210 can determine the first content item 217 being displayed on the identified one or more display regions 215. For example, the display manager 210 can determine content item 217 currently being displayed or scheduled to be displayed on an identified display region. The display manager 210 can determine, based on the first event record 211 satisfying a display region modification condition, to change a first content item 217 displayed within the first display region 215 or a value of a parameter of the first display region 215. For example, the display manager 210 can determine properties of the first content item 217 currently displayed on the display region 215. The properties may be similar to the client data or different from the client data received responsive to the event record 211. The display manager 210 can compare the properties of the first content item 217 to a user profile associated with the user of the client device 102. If the properties of the first content item 217 are similar, the display manager 210 may continue to display the first content item 217 on the display region 215. If the properties of the first content item 217 are different, the display manager 210 may search for other content item 217 to display to a user of the client device 102 and/or modifications to the first content item 217

At block 315, method 300 includes selecting second content item 217 for the display region 215. The second content item 217 can correspond to the client data received with the first event record 211. In embodiments, the display manager 210 can determine, based on the first event record 211 satisfying a display region modification condition, to change a first content item 217 displayed within the first display region 215 or a value of a parameter of the first display region 215. The display region modification condition can include or correspond to properties of the display region 215, the content item 217, the display environment 230 and/or a display zone 2410 of the client device 102. In some embodiments, the display region modification condition can include or correspond to a comparison of the properties of the content item 217 to one or more properties and/or attributes of a user profile associated with the client device 102 and/or a user of the client device 102. For example, the display manager 210 can determine to change or modify the first content item 217 if the first content item 217 does not match or correspond to one or more attributes (e.g., previous events, contests the user has interacted with) of the user profile of the user of the client device.

The display manager 210 can select second content item 217 to be displayed to a user of the client device 102 based in part on the client data. For example, the client data may include a wager recently made by the user. The display manager 210 can determine the contest corresponding to the wager and generate the second content item 217 to include the corresponding contest. In some embodiments, the user can place a wager (e.g., event record 211) on a football game at the client device 102. The display manager 210 can determine the corresponding football game and determine what time the game is on and/or what channels or provider is showing the football game. The display manager 210 can generate the second content item 217 to include the football game such that the football game is displayed at a display device 215 nearest to the client device 102.

In some embodiments, the second content item 217 can be selected based on properties of the identified display device 215. For example, the second content item 217 can be selected based on a size of the display device 215 (e.g., display region). The display manager 210 can determine how many pixels should be allocated to the second content item 217 such that the second content item 217 is displayed more prominently on or within the identified display region 215. The number of pixels may include each of the total pixels available within or on the identified display region 215 or a portion of the total pixels available (e.g., less than all) on the identified display region 215.

At block 320, method 300 includes transmitting the second content item 217 to the display region 215. The display manager 210 can transmit the generated second content item 217 to the display region 215 to be displayed to a user of the client device 102. The display manager 210 can be communicatively coupled with the display region 215 to transmit content item 217 to the display region 215. The content management system 200 may generate control signals to indicate to the display region 215 what content item 217 should be displayed based in part on users within the display environment 230. For example, the control signals can indicate a channel, station, or provider carrying the second content item 217. The control signals can include a time and/or date of when to switch over or change over to the second content item 217. The control signals can include parameters for displaying the second content item 217 on a display region 215. For example, the control signals can include a number of pixels on a display region 215 be allocated to the second content item 217 and/or a position or location on a display region 215 to display the second content item 217. In some embodiments, the display manager 210 can transmit the second content item 217 to multiple display regions 215. For example, the content management system 200 can transmit the second content item 217 to a subset of the display regions 215 within the display environment 230.

At block 325, method 300 includes dynamically changing a first value of a parameter of the display region 215 allocated to the first content item 217 and a second value of the parameter of the display region 215 allocated to the second content item 217. The second value can be different from the first value. For example, the second value can be greater than or less than the first value. The display manager 210 can modify, responsive to determining to change the first content item 217 or the value of the parameter, the first display region 215 by replacing the first content item 217 with a second content item 217 corresponding to the event associated with the first event record 211 or by adjusting the parameter of the first display region 215. For example, the display manager 210 can determine to change a value of one or more parameters (e.g., pixel allocation, location) of the first content item 217 and/or the first display region 215 (e.g., size) based in part on the client data from the first event record 211. the display manager 210 can determine to change the first content item 217 to a second content item 217 based in part on the client data from the first event record 211. In some embodiments, the display manager 210 can determine to change a value of one or more parameters (e.g., pixel allocation, location) of the first content item 217 and/or the first display region 215 (e.g., size) based in part on the client data from the first event record 211 and determine to change the first content item 217 to a second content item 217 based in part on the client data from the first event record 211.

The parameters can include but not limited to a number of pixels, a location value, or a size value. The display manager 210 can dynamically change the parameters of first content item 217 being displayed within or on a display region 215 to display the second content item 217 on the respective display device 215. For example, the display manager 210 can change the number of pixels allocated to different content item 217 displayed on the display region 215. The display manager 210 can dynamically change a first number of pixels allocated to the first content item 217 on the display region 215 and a second number of pixels allocated to the second content item 217 on the display region 215. The second number of pixels different from the first number of pixels.

The display manager 210 can decrease the number of pixels allocation to the first content item 217 and increase the number of the pixels allocated to the second content item 217. For example, the content management system 200 can dynamically increase the second number of pixels allocated to the second content item 217 responsive to a second client interaction at the client device 102 within the predetermined distance from the display region 215 and dynamically decrease the first number of pixels allocated to the first content item 217. Increasing the number of pixels may include assigning new pixels to content item 217 that was previously not displayed on the display region 215. The new content item 217 may be allocated all of the pixels available on a display device 215 such that it is the only content item 217 being displayed on the display device 215. Increasing the number of pixels may include increasing the number of pixels allocated to particular content item 217 such that it is displayed more prominently on the display region 215. For example, the number of pixels can be increased such that the particular content item 217 has more pixels as compared to other content item 217 displayed on the display region 215. Decreasing the number of pixels may include assigning no pixels to the corresponding content item 217 such that it is no longer displayed on the display region 215. Decreasing the number of pixels may include reducing the number of pixels allocated to particular content item 217 such that it is displayed less prominently on the display region 215. For example, the number of pixels can be reduced such that the particular content item 217 has less pixels as compared to other content item 217 displayed on the display region 215. In some embodiments, the display manager 210 can change the size of the display of the content item 217. The display manager 210 can dynamically increase the second number of pixels allocated to the second content item 217 responsive to a plurality of client interactions at a plurality of client devices 102 within the predetermined distance from the display region 215, and dynamically decrease the first number of pixels allocated to the first content item 217. The display manager 210 can switch or otherwise change the first content item 217 on the display region 215 to the second content item 217 on the display region 215 responsive to the first client interaction.

The display manager 210 can generate third content item 217 for the display region 215 based on a plurality of users within the predetermined distance from the display region 215. The display manager 210 can dynamically change the second number of pixels allocated to the second content item 217 on the display region 215 and a third number of pixels allocated to the third content item 217 on the display region 215. The third number of pixels different from the second number of pixels.

The display manager 210 can change the location of content item 217 on a display region 215 responsive to an event record 211. For example, the display manager 210 can move the first content item 217 from a first location to a second location on the display region 215. The display manager 210 can move the second content item 217 to from the second location to the first location on the display region 215. The first prominent location can be in a more prominent location within a screen of the display region 215. For example, the prominent location may include the middle of a screen of the display region 215, a top portion, or a bottom portion.

Content item 217 can be given a weight value corresponding to a degree of similarity to the client data received with the event record 211. The degree of similarity can be measured based in part on how many attributes of the client data corresponds to or matches a corresponding piece of content item 217. Attributes can include data points (e.g., contests bet on, players on fantasy line-ups, favorite teams, favorite sports) received in the client data corresponding to one or more pieces of content item 217 to be displayed. For example, if a user places a wager on a particular sporting event and the content item 217 is for that particular sporting event, the content item 217 can be assigned a high or highest weight value. If a fantasy line-up stored in a user profile in the client data has one or more players participating in a particular sporting event and the content item 217 is for that particular sporting event, the content item 217 can be assigned a high or highest weight value. Thus, content item 217 can be given a weight value corresponding to a degree of similarity of the user profile of the user of the client device 102. Content item 217 having a higher degree of similarity can be assigned a higher weight value. For example, content item 217 having a greater number of similarities with attributes of received client data can be assigned a higher weight value. Content item 217 having a lower degree of similarity can be assigned a lower weight value. For example, content item 217 having a lower number of similarities with attributes of received client data can be assigned a lower weight value.

In some embodiments, content item 217 can be assigned a weight value based on attributes of the content item 217. Attributes of the content item 217 can include, but not limited to, a type of sport, a time value (e.g., time of day the content is on), total value of wagers placed corresponding to the content item 217, number of wagers placed corresponding to the content item 217, and/or teams involved in the content item 217. For example, content item 217 can be assigned a higher weigh value if it has the highest total value of wagers as compared to other content scheduled to be on within the same, similar or overlapping time slot. The display manager 210 can use the weight values to select which content item 217 to display to one or more users. For example, if multiple pieces of content item 217 have similarities to attributes of received client data, the display manager 210 can select the content item 217 having the highest assigned weight value to display.

The display manager 210 can select a position or location on a screen of a display region 215 to display content item 217. Screen may include a viewing area or display screen visible to viewers of the respective display device 215. The display manager 210 can use the weight value to arrange or position multiple content item 217 on a screen of a display region 215. For example, content item 217 having a higher weight value can be position in a more prominent position on the screen of the display region 215. Content item 217 having a higher weight value can be allocated more pixels as compared to other content item 217 having a lower weight value such that the content item 217 having the higher weight value is larger or appears larger on the screen of the display region 215.

The display manager 210 can include a content display manger to determine a layout of content item 217 on a screen of a display region 215 that includes one or more predetermined locations for displaying content item 217. For example, the display manager 210 can determine a layout that includes displaying, on a screen of a display region 215, content item 217 having attributes that corresponds to attributes of client data. Content item 217 having an assigned weight value above a predetermined threshold can be displayed in a predetermined location (e.g. in a prominent position on the screen, such as at the top or middle of the screen). The display manager 210 can display content item 217 having an assigned weight value above a predetermined threshold according to one or more features, such as a stylistic feature (e.g. a particular text style for a score box or score tracker for the content (which can specify a size, a font, underlining, bold, italics, or another style, and in some embodiments the particular text style is different than another style used in the screen of the display device). The display manager 210 may use a visual indicator to highlight content item 217 having an assigned weight value above a predetermined threshold to make the content item 217 more prominent in the screen of the display region 215 (e.g. a box, circle, or other visual indicator that surrounds or is otherwise positioned relative to the content) or any other appropriate feature.

The display manager 210 can determine a layout that includes prominently displaying content item 217 based on a display score or a contest match score. The display score or match score may be determined by a contest recommendation system. The contest recommendation system may determine the display score or match score based on wagers placed corresponding to content item 217 available to be displayed. The display manager 210 may use rankings determined by the contest recommendation system to determine the layout for the screen of the display region 215. Thus, content item 217 that is more relevant to a user or group of users within a predetermined distance of the display region 215.

Figure 4A:
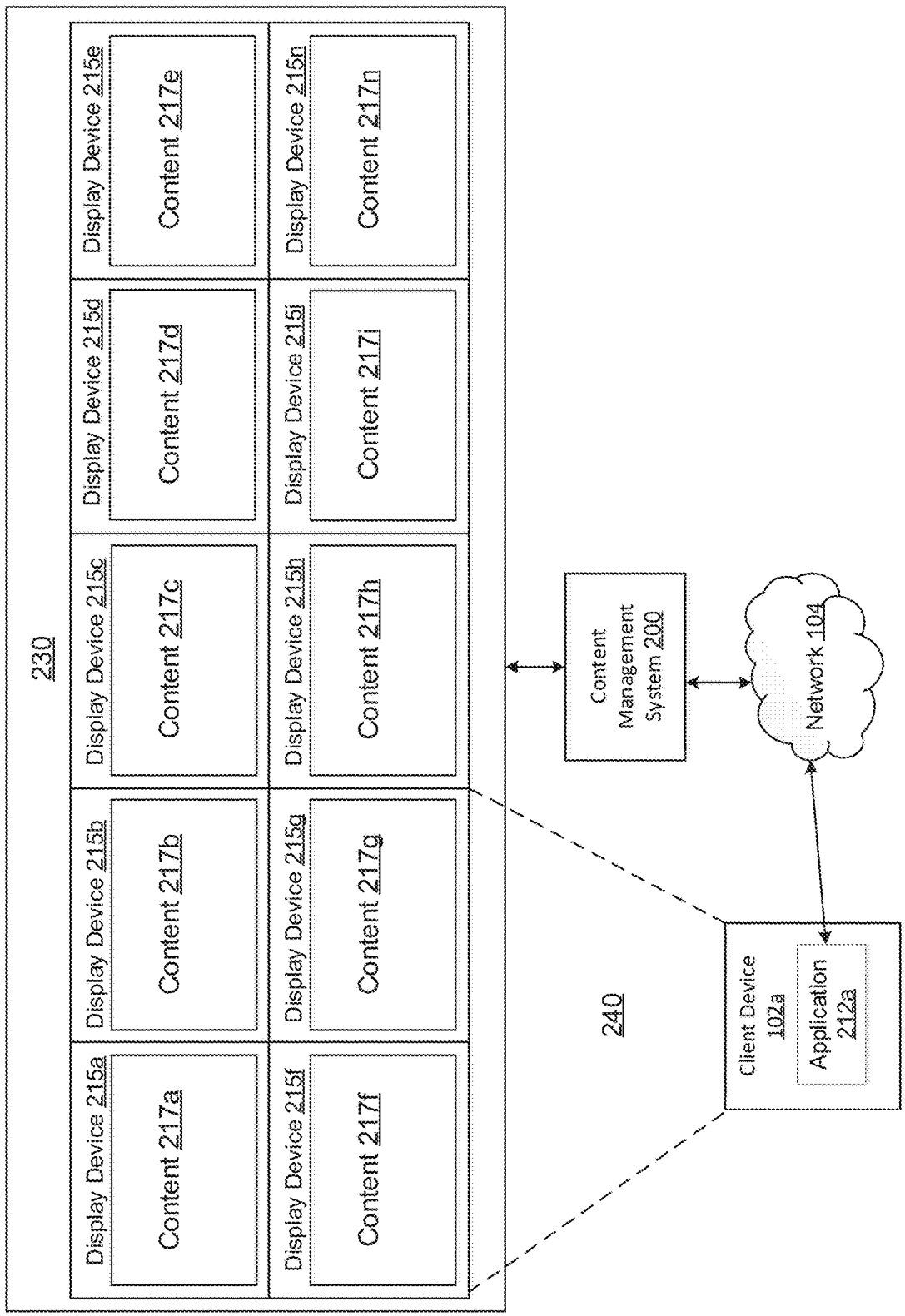
FIG. 4A depicts one or more embodiments of a content management system for dynamically adjusting display content and parameters on a display region.
Figure 4B:
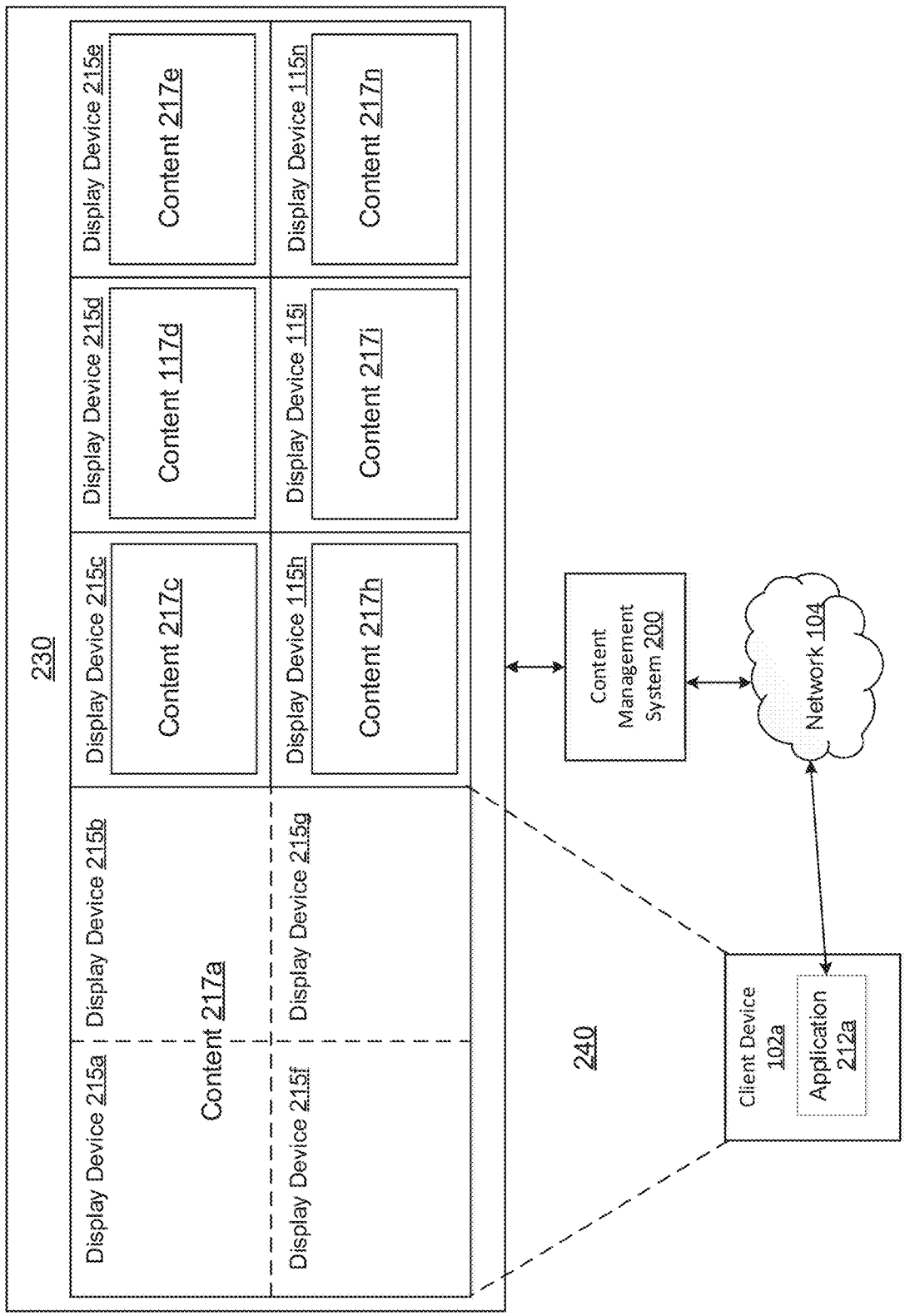
FIG. 4B depicts one or more embodiments of a content management system for dynamically adjusting display content and parameters on a display region.

Now referring to FIGS. 4A-4B, the display environment 230 is illustrated having a plurality of display regions 215a-215n. Each of the display regions 215a-215n are displaying at least one form of content items 217a-217n, respectively (e.g., sports contest). The display environment 230 includes the content management system 200 that is communicatively coupled with a first client device 102a. For example, the first client device 102a can be logged into the content management system 200 at the display environment 230. The display regions 215a-215n can be controlled by the content management system 200. For example, each of the display regions 215a-215n can include a number of pixels and the content management system 200 and/or display manager 210 can control the allocation of the pixels to different forms or types of content item 217 responsive to, for example, but not limited to, one or more event record 211 by one or more client devices 102 within the display environment 230. For example, each of the display regions 215a-215n can display different sporting contests of the same sport (e.g., a plurality of football games) or display different sporting contests of one or more different sports (e.g., football games and baseball games).

The display manager 210 can dynamically modify the parameters of the content item 217 (e.g., number of pixels, location) displayed on the different display regions 215a-215n to display content item 217 that a user of a client device is more likely to be interested in and/or interact with (e.g., places bets, wagers). In embodiments, the display manager 210 can dynamically modify the parameters of the content item 217 (e.g., number of pixels, location) displayed on the different display regions 215a-215n to display content item 217 that satisfy a display region modification condition and that a user of a client device is more likely to be interested in and/or interact with (e.g., places bets, wagers). For example, and as will be described in greater detail below, FIG. 4A can correspond to a first time period and FIG. 4B can correspond to a second different time period. The display manager 210 can dynamically change or modify the display size, display location or otherwise enhance the display of the content item 217 displayed on display regions 215a-215n from the first time period (FIG. 4A) to the second time period (FIG. 4B) based in part on one or more event records 211 within the display environment 230. For example, the display manager 210 can dynamically change or modify the display size, display location or otherwise enhance the display of first content item 217a from the first time period (e.g., FIG. 4A) to the second time period (FIG. 4B) by dynamically increasing a number of pixels allocated to the first content item 217a on one or more of display regions 215a-215n to display the first content item 217a more prominently within the display environment 230 for a user of at least one client device 120. For example, the display manager 210 can dynamically change or modify the properties of content item 217 on one or more display regions 215a-215n responsive to score changes, changes in betting activity, or user profile attributes of one or more users within the display environment 230.

In FIG. 4A, each of the display regions 215a-215n can display at least one content item 217. Thus, within each display region 215, each of the content item 217 can be allocated or assigned the same number of pixels by the display manager 210. For example, on a first display region 215a, a first content item 217a can be allocated all of the pixels on the first display region 215a and thus, is the only content being displayed on the first display region 215a. On a second display region 215b, a second content item 217b can be allocated all of the pixels on the second display region 215b and thus, is the only content being displayed on the second display region 215b.

The first client device 102a can be associated with a first display zone 240 or have a first display zone 240 that includes a first group of display regions 215. A display zone 240 can include a viewing zone or viewing area in which the client device 102 or a user of the client device 102 can see a display region 215 and/or a display environment 230. In some embodiments, for example, where the first client device 102a is a portable device, the first display zone 240 can change with a change in position or location of the first client device 12 within the display environment 230. The user of the first client device 102a can establish or create a first display zone 240 to select first group of display regions 215. The first client device 102a can be positioned having a display zone 240 that includes a first display region 215a, a second display region 215b, a sixth display region 215f, and a seventh display region 215g. The display manager 210, responsive to an event record 211 (e.g., log in event) at the first client device 102a can assign one or more of the display regions 215a-215n to the first client device 102a. For example, the display manager 210 can determine a location of the first client device 102a. Using the location of the first client device 102a, the display manager 210 can determine a display zone 240 of the first client device 102a. Responsive to determining the display zones 240, the display manager 210 can assign one or more of the display regions 215a-215n to the first client device 102a or assign one or more of the display regions 215a-215n to the display zone 240. For example, if the display zone 240 of the first client device 102a includes four different display regions 215, the display manager 210 can assign one of the four display regions 215 to the first client device 102a or the display zone 240 of the first client device 102a. The display manager 210 can assign multiple but not all of the four display regions 215 to the first client device 102a or the display zone 240 of the first client device 102a. The display manager 210 can assign all four of the display regions 215 to the first client device 102a or the display zone 240 of the first client device 102a.

When a display region 215 is assigned to a client device 102, the content item 217 displayed on the respective display region 215 can be based on client data from the respective client device 102. For example, the display manager 210 can select content for the display regions 215 within the display zone 240 of the first client device 102a based on a recently made wager or based on user profile attributes, (e.g., fantasy sports lineups, hometown teams). Thus, the display manager 210 can select content item 217 that a user of the first client device 102a has recently bet on or is more likely to be interested in.

A user of the first client device 102a can enter the display environment 230 (e.g., sportsbook of a casino) and login to the content management system 200 through an application 212a executing on the first client device 102a. The login event can correspond to or initiate an event record 211. Responsive to or as the event record 211 (e.g., user interaction) is being generated, the display manager 210 can receive client data, such as a user profile of the user of first client device 102a, recent wagers placed by the user of first client device 102a, and/or fantasy sports lineups of the user of first client device 102a. Responsive to or as the event record 211 is being generated, the display manager 210 can extract for example, from the display manager 210 can extract client data corresponding to the user of the first client device 102a from the fantasy sports system 220.

Responsive to the event record 211, the display manager 210 can determine one or more display regions 215a-215n within the display environment 230 that are within a display zone of the first client device 102a. For example, the display manager 210 can determine which display regions 215a-215n are viewable from a location that the first client device is positioned at within the display environment 230. The display manager 210 can select one display region 215 if multiple display regions 215a-215n are within the display zone 240 of the first client device 102a, for example, based on a distance of the respective display region 215 from the first client device 102a. The display manager 210 can select multiple display regions 215 if multiple display regions 215a-215n are within the display zone 240 of the first client device 102a.

After identifying the display regions 215 within the display zone 240 of the first client device 102a, the content management system 200 can determine the content item 217 currently being displayed on the respective display regions 215. The display manager 210 can determine the content item 217 to be displayed (or aired) on the respective display regions 215 in the future. For example, the display manager 210 can access a television guide, a listing guide, or include a listing guide that has a schedule of the content item 217 to be display on the different channels accessible through the display regions 215.

The display manager 210 can select a first display region 215a displaying first content item 217a that is within the display zone 240 of the first client device 102a and assign the first display region 215a to the first client device 102a or to the display zone 240 of the first client device 102a. The first display region 215 can be assigned to the first client device 102a to display content item 217 that a user of the first client device 102a is more likely to be interested in or more likely to interact with (e.g., place wagers on).

The display manager 210 can compare the client data from the first client device 102a to properties of the first content item 217a to determine if the properties of the first content item 217a correspond to the client data (e.g., user profile attributes) received from the first client device 102a and thus, determine an interest level in the first content item 217a for the user of the first client device 102a. The properties of the first content item 217a can include, but not limited to, a type of sport, the teams or organizations competing in the contest, the cities the teams or organizations represent, and/or a time left in the contest. If the first content item 217a has one or more common properties with the client data, the display manager 210 can dynamically adjust the content item 217 on one display region 215 or multiple display regions 215 for the user of the first client device 102a. For example, and referring to FIGS. 4A-4B, the display regions 215a-215n can be part of or correspond to display regions of a single display region 215 (e.g., large screen televisions, projection screen televisions, wraparound televisions). Thus, each of the display regions 215a-215n can correspond to regions of the large screen display device and/or a grouping of pixels of the large screen display device.

The display regions 215a-215n can be separate display regions that can be synched together to display or show the same content item 217. For example, multiple display regions 215a-215n can be positioned next to each other and thus, appear to form a large screen display device. Each of the multiple display regions 215a-215n can be assigned or allocated to display a portion of content item 217. For example, the content item 217 may correspond to a football game, and each of the multiple display regions 215a-215n can be assigned or allocated to display a portion of the football game such that when the multiple display regions 215a-215n are positioned next to each other, it appears as if the football game is being displayed on a large screen display device made up of the multiple display regions 215.

The display manager 210 can select second content item 217b to display for the user of the first client device 102a. The second content item 217b can have one or more properties in common with the client data from the first client device 102a. In some embodiments, the second content item 217b can be selected based on a wager the user of the first client device 102a entered through the application 212 executing on the first client device 102a.

The display manager 210 can transmit the second content item 217b to the first display region 215a to display the second content item 217b on the first display region 215a. In some embodiments, the display manager 210 can determine a value of a parameter allocated to the first content item 217a being displayed on the first display region 215a and a value of a parameter of the second content item 217b. The parameter can include, but not limited to, a number of pixels or a location value. For example, the display manager 210 can determine a number of pixels to allocate to the second content item 217b. The number of pixels can be selected based at least in part on the number of pixels available on each individual display region 215a-215n, the number of pixels available for all display regions 215a-215n combined and/or the type of content (e.g., type of sport). The display manager 210 can dynamically change a value of the parameter allocated to the first content item 217a. For example, the display manager 210 can decrease the number of pixels allocated to the first content item 217a such that the first content item 217a is displayed less prominently. The display manager 210 can reduce the number of pixels allocated to the first content item 217a to zero such that the first content item 217a is no longer displayed on the first display region 215. The display manager 210 can change a location or position of the first content item 217a on the first display region 215a such that the first content item 217a is displayed less prominently. For example, the display manager 210 can move the first content item 217a such that it is no longer in a middle portion of the first display region 215a or such that the first content item 217a is no longer in a middle portion of the display zone 240 of the first client device 102a. To change a location of the first content item 217a, the display manager 210 can allocate a new pixels corresponding to a different region or portion of a screen of the first display region 215a to the first content item 217a.

The display manager 210 can dynamically change a value of the parameter allocated to the second content item 217a. For example, the display manager 210 can increase the number of pixels allocated to the second content item 217b such that the second content item 217b is displayed more prominently. The display manager 210 can provide the second content item 217b with a new number of pixels, for example, if the second content item 217b was previously not being displayed. The display manager 210 can change a location or position of the second content item 217b on the first display region 215a such that the second content item 217b is displayed more prominently. For example, the display manager 210 can move the second content item 217b such that the second content item 217b is now displayed in a middle portion of the first display region 215a or such that the second content item 217b is displayed in a middle portion of the display zone 240 of the first client device 102a. To change a location of the second content item 217b, the display manager 210 can allocate a new pixels corresponding to a different region or portion of a screen of the first display region 215a to the second content item 217b.

In some embodiments, the display manager 210 can dynamically increase a value of the parameter allocated to the second content item 217a such that the second content item 217a is displayed on multiple display regions or all of the display regions 215 within the display zone 240 of the first client device 102a. For example, and still referring to FIG. 4B, the display manager 210 can dynamically increase the number of pixels allocated to the second content item 217b such that the second content item 217b is displayed on the first display region 215a, the second display region 215b, the sixth display region 215f, and the seventh display region 215g. Thus, the second content item 217b can be displayed across all of the display regions 215a, 215b, 215f, 215g within the display zone 240 of the first client device 102a.

Figure 5:
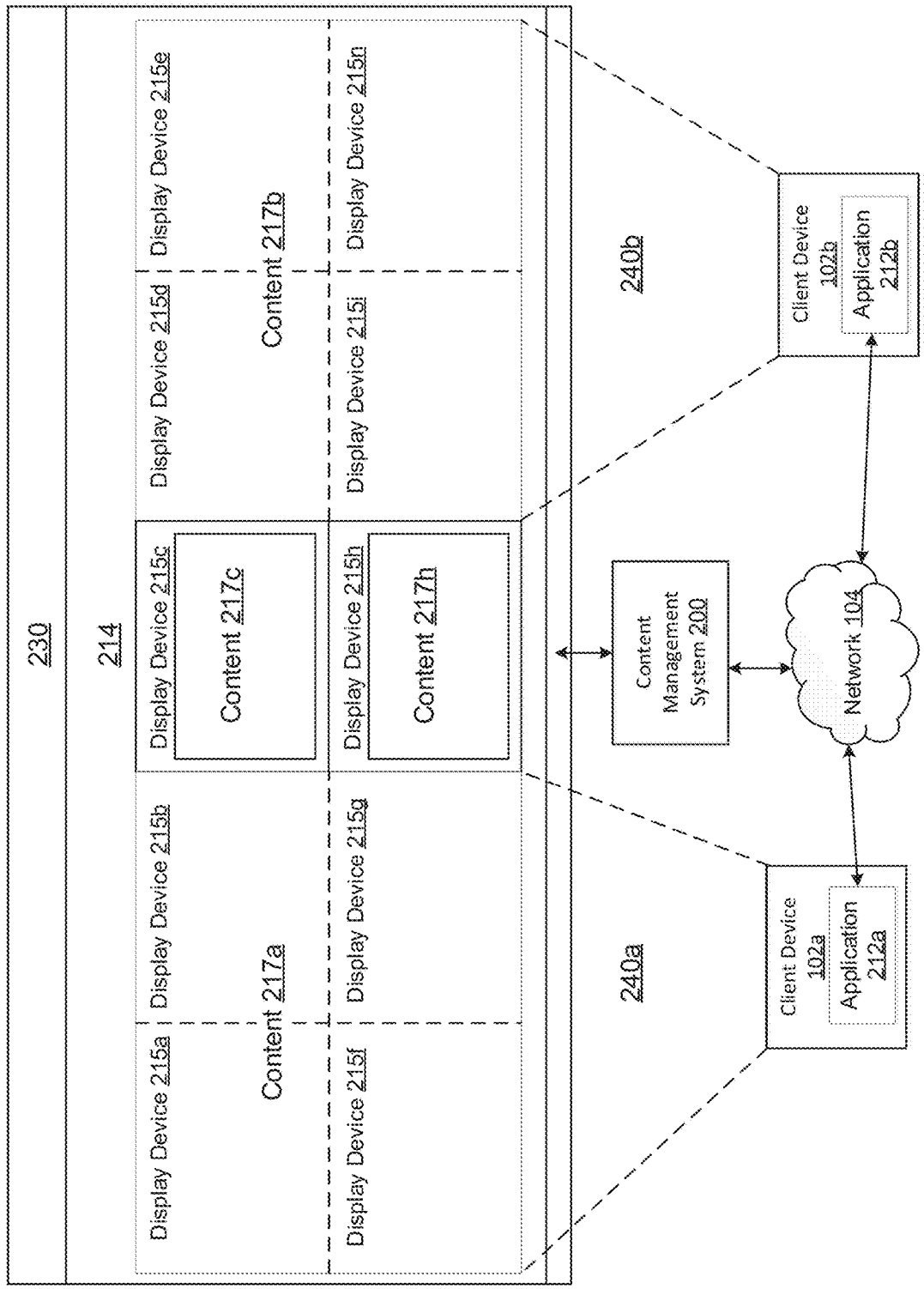
FIG. 5 depicts one or more embodiments of a content management system for dynamically adjusting display content and parameters on a display region.

Now referring to FIG. 5, the display environment 230 is illustrated having a large screen display region 214 having multiple smaller display regions 215a-215n corresponding to different regions of the large screen display region 214. For example, each of the display regions 215a-215n can correspond to a group of pixels within the large screen display region 214. For example, a first display region 215a can correspond to a first group of pixels of the e large screen display region 214 and a second display region 215b can correspond to a second group of pixels of the large screen display region 214. Each of the display regions 215a-215n can include or be allocated a number of pixels that are less than a total number of pixels of large screen display region 214. The number of pixels and location of each of the display regions 215a-215n (or display regions) can be controlled by the content management system 200 and/or the display manager 210. For example, the content management system 200 and/or display manager 210 can allocate a number of pixels and/or determine a location of each of the display regions 215a-215n within large screen display region 214 based in part on the display zones 240a, 240b of one or more client devices 102 within the display environment 230.

In FIG. 5, a first client device 102a and a second client device 102 are interacting with the content management system 200 via network 104. The first client device 102a can be located in a different area of the display environment 230 as compared to the second client device 102b and thus, have a different view of the large screen display region 214. For example, the first client device 102a can have a first display zone 240a that includes a first display region 215a, a second display region 215b, a sixth display region 215f, and a seventh display region 215g. The second client device 102a can have a second display zone 240b that includes a fourth display region 215d, a fifth display region 215e, a ninth display region 215i, and a tenth display region 215n. The display manager 210 can dynamically control and modify the content item 217 of the display regions 215a-215n based in part on the location of the users of the first client device 102a and the second client device 102b.

The first client device 102a can generate an event record 211 with the content management system 200. The event record 211 can include a wager being placed through the application 212 executing on the first client device 102a and with the c display manager 210. Responsive to receiving the wager, the display manager 210 can determine if the current content on the display regions 215a, 215b, 215f, and 215g within the first display zone 240a should be modified based in part on the wager placed by a user of the first client device 102a. For example, the display manager 210 can dynamically increase the first content item 217a that corresponds to a sports contest the user of the first client device 102a just placed a wager on. The display manager 210 can increase the number of pixels allocated to the first content item 217a such that it is displayed across each of the display regions 215a, 215b, 215f, and 215g within the first display zone 240a.

The second client device 102b can generate an event record 211 with the content management system 200. The event record 211 can include placing a sports bet on a current sports contest through the application 212 executing on the second client device 102b and with the display manager 210. Responsive to receiving the sports bet, the display manager 210 can determine if the current content on the display regions 215d, 215e, 215i, and 215n within the second display zone 240b should be modified based in part on the sports bet received from a user of the second client device 102b. For example, the display manager 210 can dynamically increase the second content item 217b that corresponds to a sports contest correspond to the sports bet received from the user of the second client device 102b. The display manager 210 can increase the number of pixels allocated to the second content item 217b such that it is displayed across each of the display regions 215d, 215e, 215i, and 215n within the second display zone 240b.

It should be appreciated that although the specification and claims refer to fantasy sports, the application is not limited to fantasy sports. Rather, the scope of the application may extend to other contexts where a content management system or server maintains a dynamic set of resources that can be monitored for projected utilization and actions can be taken based on the projected utilization, including the generation or allocation of new resources or actions that cause traffic to be directed to one or more resources of the existing set of resources.

The invention claimed is:

1. A method, comprising:
presenting, by one or more processors, content on a plurality of display regions of a display system, a subset of the plurality of display regions presenting television content;
receiving, by the one or more processors, from a client device, a wager identifying a live sporting event;
responsive to receiving the wager, determining, by the one or more processors, that at least one display region of the subset is presenting a broadcast of the live sporting event;
detecting, by the one or more processors, a change in a score of the live sporting event; and
adjusting, by the one or more processors, responsive to determining that the at least one display region is presenting the broadcast of the live sporting event and based on the change in the score, a display parameter of the at least one display region of the display system.

2. The method of claim 1, wherein adjusting the display parameter of the at least one display region comprises adjusting, by the one or more processors, a first number of pixels assigned to the at least one display region.

3. The method of claim 1, further comprising determining, by the one or more processors, that the wager causes a display region modification condition to be satisfied.

4. The method of claim 3, wherein the display parameter of the at least one display region is adjusted responsive to determining that the at least one display region is presenting the live sporting event and responsive to determining that the wager causes the display region modification condition to be satisfied.

5. The method of claim 1, further comprising adjusting, by the one or more processors, a number of pixels allocated to a second content item presented by the display system responsive to determining that the at least one display region is presenting the live sporting event.

6. The method of claim 1, further comprising adjusting, by the one or more processors, a display location of the at least one display region responsive to determining that the at least one display region is presenting the live sporting event.

7. The method of claim 6, further comprising determining, by the one or more processors, the display location based at least on location data corresponding to the client device.

8. The method of claim 1, further comprising:
detecting, by the one or more processors, an increase in wagering activity for the live sporting event; and
adjusting, by the one or more processors, the display parameter of the at least one display region presented by the display system responsive to detecting the increase in wagering activity.

9. The method of claim 1, further comprising replacing, by the one or more processors, a second content item presented by the display system with the at least one display region.

10. A system, comprising:
one or more processors coupled to non-transitory memory, the one or more processors configured to:
present content on a plurality of display regions of a display system, a subset of the plurality of display regions presenting television content;
receive, from a client device, a wager identifying a live sporting event;
responsive to receiving the wager, determine that at least one display region of the subset is presenting a broadcast of the live sporting event;
detect a change in a score of the live sporting event; and
adjust, responsive to determining that the at least one display region is presenting the broadcast of the live sporting event and based on the change in the score, a display parameter of the at least one display region of the display system.

11. The system of claim 10, wherein the one or more processors are further configured to adjust the display parameter of the at least one display region by performing operations comprising adjusting a first number of pixels assigned to the at least one display region.

12. The system of claim 10, wherein the one or more processors are further configured to determine that the wager causes a display region modification condition to be satisfied.

13. The system of claim 12, wherein the display parameter of the at least one display region is adjusted responsive to determining that the at least one display region is presenting the live sporting event and responsive to determining that the wager causes the display region modification condition to be satisfied.

14. The system of claim 10, wherein the one or more processors are further configured to adjust a number of pixels allocated to a second content item presented by the display system responsive to determining that the at least one display region is presenting the live sporting event.

15. The system of claim 10, wherein the one or more processors are further configured to adjust a display location of the at least one display region responsive to determining that the at least one display region is presenting the live sporting event.

16. The system of claim 15, wherein the one or more processors are further configured to determine the display location based at least on location data corresponding to the client device.

17. The system of claim 10, wherein the one or more processors are further configured to:
   detect an increase in wagering activity for the live sporting event; and
   adjust the display parameter of the at least one display region presented by the display system responsive to detecting the increase in wagering activity.

18. The system of claim 10, wherein the one or more processors are further configured to replace a second content item presented by the display system with the at least one display region.

19. The method of claim 1, wherein the wager is a second wager, and further comprising:
   responsive to receiving a first wager prior to the second wager, causing, by the one or more processors, the at least one display region of the subset to present the broadcast of the live sporting event.

20. The system of claim 10, wherein the wager is a second wager, and wherein the one or more processors are further configured to:
   responsive to receiving a first wager prior to the second wager, cause the at least one display region of the subset to present the broadcast of the live sporting event.

* * * * *